United States Patent [19]
Sommer

[11] 3,845,560
[45] Nov. 5, 1974

[54] GAGE BLOCK

[75] Inventor: Peter J. Sommer, Elmhurst, Ill.

[73] Assignee: American Gage & Machine Company, Elgin, Ill.

[22] Filed: July 18, 1973

[21] Appl. No.: 380,383

[52] U.S. Cl. .............................. 33/168 R, 33/174 H
[51] Int. Cl. ............................................. G01b 3/30
[58] Field of Search........... 33/174 H, 174 P, 178 B, 33/178 R, 168 R

[56] References Cited
UNITED STATES PATENTS
3,417,475   12/1968   Vlasaty ............................ 33/168 R
FOREIGN PATENTS OR APPLICATIONS
468,007   4/1914   France ............................ 33/168 R

*Primary Examiner*—Louis R. Prince
*Assistant Examiner*—Willis Little
*Attorney, Agent, or Firm*—Burmeister, Palmatier & Hamby

[57] ABSTRACT

The illustrated gage block has all of the advantages of a cylindrical gage block, together with the versatility of a rectangular gage block. The block has three pairs of diametrically opposite surfaces which are parallel with three rectangularly related axes. At least the surfaces of the first pair are cylindrically curved and constitute segments of a cylindrical surface centered about the first axis. The second and third pairs of surfaces are illustrated as rectangularly related parallel plane surfaces. The surfaces of the second pair preferably extend perpendicular to the cylindrical axis of the first pair. The surfaces of the third pair preferably extend parallel to the cylindrical axis and are symmetrically disposed on opposite sides thereof. The cylindrically curved surfaces are particularly valuable for checking and calibrating a micrometer caliper. The other surfaces may also be employed for this purpose or for calibrating dial indicators, automatic gaging devices and the like.

1 Claim, 4 Drawing Figures

PATENTED NOV 5 1974  3,845,560
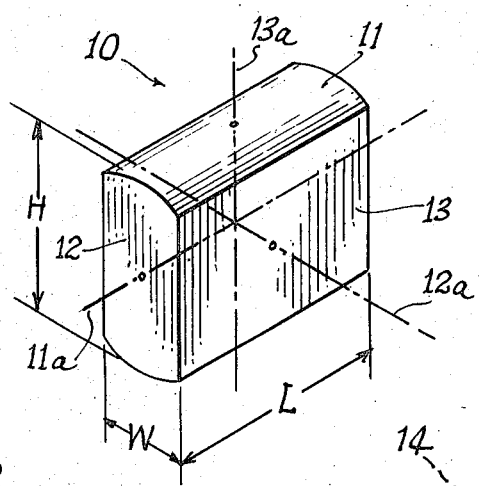
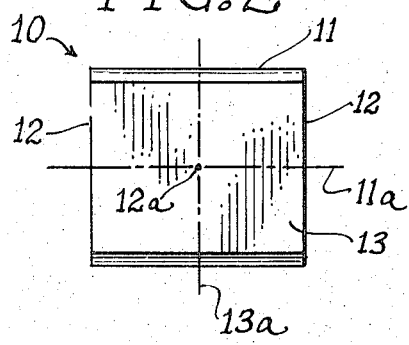
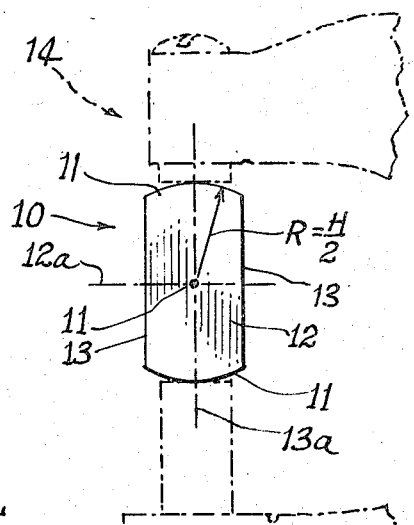
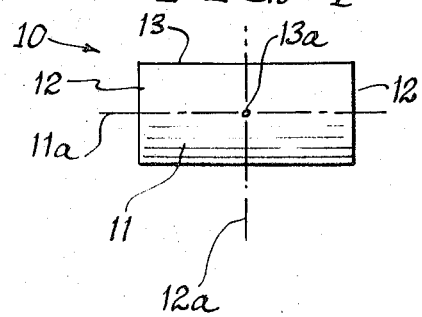
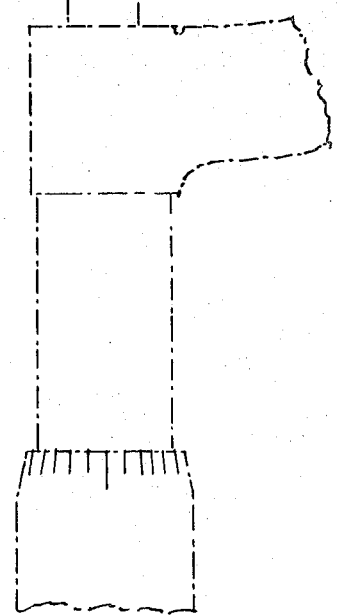

GAGE BLOCK

This invention relates to gage blocks which may be used for checking and calibrating precision measuring equipment, such as micrometer calipers, dial indicators, automatic gaging devices and the like.

One object of the present invention is to provide a gage block which combines all of the advantages of a cylindrical gage block with the versatility of a rectangular block.

A further object is to provide such a new and improved gage block which is especially well adapted for checking and calibrating micrometer calipers, but may also be employed for performing numerous other gaging functions.

Another object is to provide such a new and improved gage block which is easy to manufacture and low in cost.

Thus, the present invention preferably provides a gage block having three pairs of diametrically opposite surfaces which extend parallel to three rectangularly related axes. At least the surfaces of the first pair preferably are cylindrically curved and constitute segments of a cylindrical surface centered about the first axis. The other surfaces could also be cylindrically curved, but are preferably in the form of parallel plane surfaces which are rectangularly related. Thus, the second surfaces preferably extend perpendicular to the cylindrical axis of the first surfaces. The third surfaces preferably extend parallel to the cylindrical axis and are disposed symmetrically on opposite sides thereof.

The cylindrically curved surfaces are especially advantageous for checking and calibrating micrometer calipers, while the parallel plane surfaces are especially valuable for checking dial indicators, automatic gaging devices and the like.

Further objects, advantages and features of the present invention will appear from the following description, taken with the accompanying drawings, in which:

FIG. 1 is a perspective view of a gage block to be described as a preferred illustrative embodiment of the present invention.

FIG. 2 is a side elevational view of the gage block.

FIG. 3 is an end elevation showing the manner in which the block may be used for checking and calibrating micrometer calipers.

FIG. 4 is a top plan view of the gage block.

As just indicated, the drawings illustrate a gage block 10 which may be made of metal or any other suitable material. The block 10 preferably has three pairs of diametrically opposite surfaces 11, 12 and 13, which are parallel to three rectangularly related axes 11a, 12a and 13a. At least the surfaces of one pair are preferably cylindrically curved and thus constitute segments of a cylindrical surface. In this case, the first diametrically opposite surfaces 11 are cylindrically curved and constitute segments of a cylindrical surface centered about the axis 11a.

The height, width and length of the gage block 10 are designated H, W and L in FIG. 1. The diameter of the cylindrical surface corresponds to the height H. Thus, as indicated in FIG. 3, the radius R of each cylindrically curved surface 11 is equal to H/2, or one-half the height H. The radius R extends from the cylindrical axis 11a.

The second and third pairs of surfaces 12 and 13 could also be cylindrically curved so as to constitute segments of other cylindrical surfaces. However, the illustrated surfaces 12 and 13 are preferably in the form of rectangularly related plane surfaces. Thus, the second surfaces 12 are parallel to each other and are preferably perpendicular to the cylindrical axis 11a. The third surfaces 13 are preferably parallel to each other and parallel to the cylindrical axis 11a. Preferably, the surfaces 13 are disposed symmetrically on opposite sides of the cylindrical axis 11a. Thus, the surfaces 13 are equally spaced from the cylindrical axis 11a.

FIG. 3 illustrates the manner in which the cylindrically curved surfaces 11 of the gage block 10 may be employed very advantageously for checking and calibrating a micrometer caliper 14. Because of the cylindrical curvature of the surfaces 11, the angular position of the gage block 10 is not critical when used to check the micrometer caliper 14. Thus, the gage block 10 has all of the advantages of a cylindrical gage for use in checking and calibrating micrometer calipers.

For other gaging purposes, the gage block 10 has the versatility of a rectangular gage block. Of course, the second and third surfaces 12 and 13 can also be used for checking and calibrating micrometer calipers. However, they are well adapted for carrying out a wide variety of gaging functions, such as the calibration of dial indicators, automatic gaging devices and the like. Moreover, the gage block 10 may be employed in a variety of ways for setting up machine tools for the precise machining of workpieces.

The height H, width W and length L of the gage block 10 are preferably three different dimensions to increase the versatility of the gage block. Thus, the block can be employed for checking or calibrating three different dimensions. It will be understood that the dimensions of the block can be varied as needed for many different gaging operations.

I claim:
1. A gage block,
   comprising a block having first, second and third pairs of diametrically opposite gaging surfaces extending precisely parallel to first, second and third rectangularly related axes,
   said first pair of surfaces being cylindrically curved and constituting uninterrupted segments of a cylindrical surface centered about said first axis,
   said second pair of surfaces being in the form of uninterrupted, precisely parallel and flat plane gaging surfaces extending perpendicular to said first axis,
   said third pair of surfaces being in the form of uninterrupted precisely parallel and flat plane gaging surfaces which are rectangularly related to said second pair of surfaces,
   said surfaces of said third pair being symmetrically disposed on opposite sides of said first axis and precisely parallel thereto.

* * * * *